Figure 1:
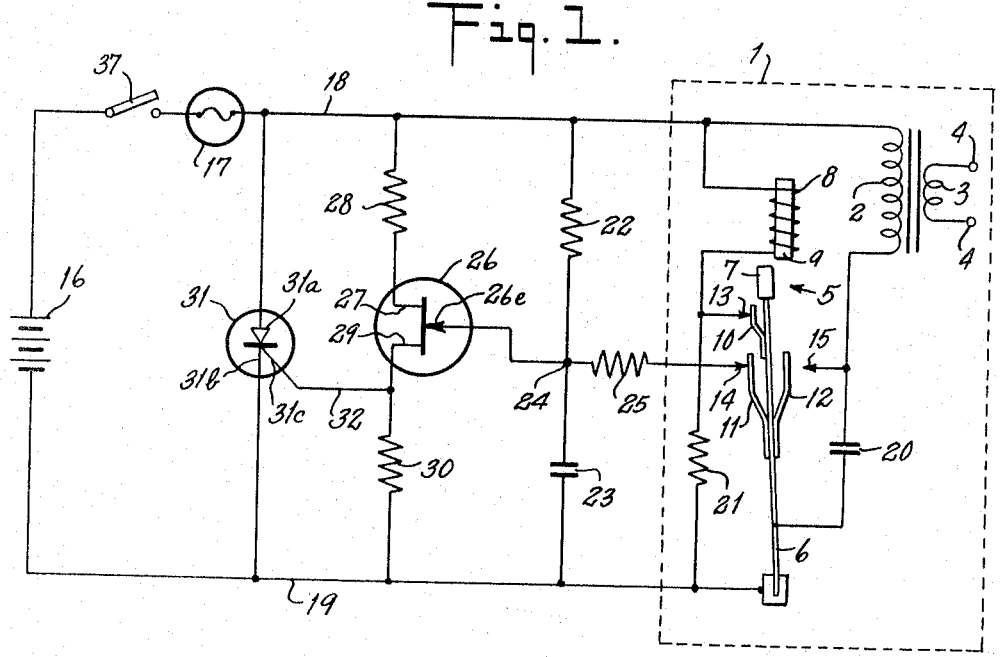

June 13, 1967

J. V. McNULTY 3,325,718

PROTECTIVE CIRCUIT FOR VIBRATOR TYPE
D.C.-A.C. CONVERTERS

Filed Dec. 4, 1963

INVENTOR.
JOHN V. McNULTY

BY Lester W. Clark
ATTORNEY

United States Patent Office 3,325,718
Patented June 13, 1967

3,325,718
PROTECTIVE CIRCUIT FOR VIBRATOR TYPE
D.C.-A.C. CONVERTERS
John V. McNulty, Norwich, N.Y., assignor to General
Laboratory Associates, Inc., Norwich, N.Y., a corporation of New York
Filed Dec. 4, 1963, Ser. No. 327,996
1 Claim. (Cl. 321—11)

This invention relates to a protective apparatus for a converter of direct current to alternating current, of the type employing a mechanical vibrator.

The vibrating reed units commonly employed in converters of direct current to alternating current are built as plug-in units so as to be readily replaceable upon failure. These vibrators control an intermittent flow of direct current in the primary winding of a transformer, thereby inducing an alternating current in the secondary. The maximum current which the primary winding carries during its intermittent energization is in many cases considerably greater than the continuous current rating of the winding. The protection of such circuits by means of fuses, circuit breakers and the like is difficult, because the protective device must carry intermittently a current higher than its continuous rating. While fuses and circuit breakers have been devised to provide protection against current exceeding a given value over a relatively long interval of time, while passing current greater than that value for a relatively short interval, such devices tend to be complex and expensive. It has therefore been a common practice, in converters of the type described, to omit any protective fuse or circuit breaker.

A common type of failure in such a vibrator involves a sticking of the vibrator reed in a position such that the primary winding is energized, and a high current flows through the winding continuously. Such a failure of the vibrator may result in a burning out of the winding. Since the transformer is a considerably more expensive unit than the vibrator, it has been desired to find some arrangement which would protect the transformer against such failure of the vibrator reed.

An object of the present invention is to provide an improved protective circuit for a vibrator type converter of direct current to alternating current.

Another object of the invention is to provide such a protective circuit including a fuse having a current rating substantially higher than the current requirements of the converter, together with means responsive to the sticking of the vibrator in its winding energizing position to overload the fuse, thereby disrupting it and cutting off the current through the converter.

Another object is to provide apparatus of the type described in which the fuse is located inside the same sealed unit with the vibrator reed, so that both may be removed and replaced in one operation.

The foregoing and other objects of the invention are attained in the apparatus described herein. That apparatus includes a transformer whose primary winding is connected for single end operation, i.e., so as to be energized by intermittent pulses, of direct current, all in the same direction. Energization of the primary winding from any suitable source of direct current is cotrolled by a conventional mechanical vibrator having one contact for controlling the current flow in its own coil, and two alternately closed contacts, one of which is utilized to close intermittently a circuit for energizing the transformer winding with direct current of a predetermined polarity. The other of these two contacts is used in conventional circuits to energize the primary winding with direct current flowing in the opposite sense. In the present circuit, that other contact is utilized to discharge periodically a capacitor which is charged continuously through a resistor from the direct current supply. As long as the vibrator is running properly, the capacitor is periodically discharged, and its charge never exceeds a predetermined potential. If the vibrator reed sticks in the coil energizing position, the charge on the capacitor continues to increase. An amplifying device is provided which responds to the potential across the capacitor and is effective when the potential exceeds a predetermined value to reduce substantially the impedance of a load device connected in parallel with the inverter, so as to overload and thereby blow out a high current fuse connected between the source of energy and the converter.

Other objects and advantages of the invention will become apparent from a consideration of the following specification and claims, taken together with the accompanying drawing.

Figure 2:
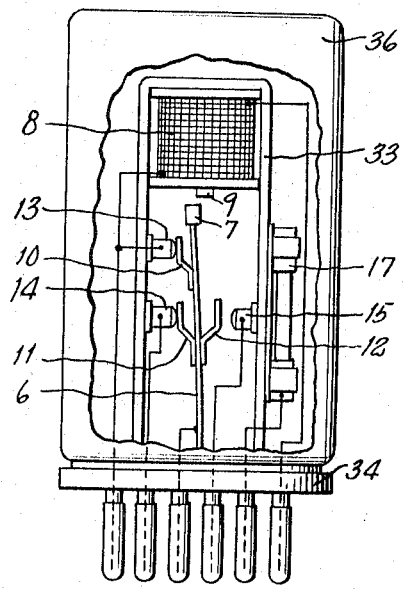

In the drawing:

FIG. 1 is a wiring diagram of the protective circuit embodying the invention; and FIG. 2 is an elevational view of a plug-in vibrator which may be used in the circuit of FIG. 1, with part of the cover broken away to reveal the interior structure.

Referring to FIG. 1, there is shown a converter generally indicated by the reference numeral 1, including a transformer having a primary winding 2 and a secondary winding 3 connected to two output terminals 4. The converter 1 also includes a vibrator generally indicated at 5, comprising a flat reed 6 mounted at its lower end and carrying a magnetic armature 7, typically a soft iron slug, at its tip. A driving coil 8 encircles a pole piece 9, which extends parallel to the reed but has its tip slightly offset from the armature 7 when the reed is in its unstressed position. The reed 6 carries three contacts 10, 11 and 12, mounted at the free ends of leaf springs which are fixed at their opposite ends to the reed 6, and cooperating respectively with stationary contacts 13, 14 and 15.

Direct current is applied to the converter 1 from a battery 16 through a fuse 17 and a wire 18, which serves as the positive supply line. A negative supply line 19 is grounded.

The energizing circuit for primary winding 2 may be traced from the positive terminal of battery 16 through fuse 17, wire 18, primary winding 2, contacts 15 and 12, the reed 6 and wire 19 to the negative terminal of battery 16. An arc suppressing capacitor 20 is connected between the contacts 15 and 12.

The energizing circuit for the coil 8 of the vibrator 5 may be traced from positive supply line 18 through coil 8, contacts 13 and 10 and reed 6 to the grounded negative supply line 19. A resistor 21 is connected between contact 13 and ground and serves to suppress arcs between the contacts 13 and 10.

A resistor 22 and a capacitor 23 are connected in series between the positive supply line 18 and the negative supply line 19. The common junction 24 between resistor 22 and capacitor 23 is connected through another resistor 25 to the stationary contact 14.

The junction 24 is also connected to the emitter 26e of a double-base diode 26. One base 27 of the double-base diode 26 is connected through a resistor 28 to the positive supply line 18. The other base 29 of the double-base diode 26 is connected through a resistor 30 to the negative supply line 19.

A controlled semiconductor device 31 has an anode 31a, a cathode 31b, and a control electrode 31c. The control electrode 31c is connected directly through a wire 32 to the base 29 of double-base diode 26. The device 31 has a characteristic such that its anode-cathode impedance is very high until a predetermined control potential is applied to the control electrode 31c, whereupon the anode-cathode impedance breaks down and becomes very low.

The double-base diode 26 maintains a substantial current flow through resistors 28 and 30 as long as the emitter 26e remains below a predetermined potential. The potential at control electrode 31c is then determined by the voltage divider action of resistors 28 and 30 and is more positive than the predetermined control potential required at electrode 31c to break down the device 31. When the potential of emitter 26e exceeds a certain threshold value, the current flow through resistors 28 and 30 decreases rapidly and the signal potential applied to control electrode 31c becomes more negative than the predetermined control potential, thereby switching the device 31 to its low impedance condition.

*Operation*

The vibrator 5 is shown with the reed 6 in its unstressed position, with the contacts 10 and 11 closed against their associated contacts 13 and 14 and with the contact 12 separated from the contact 15. If the circuit is then energized, as by closure of a switch 35, the energization of coil 8 attracts the armature 7 swinging the reed and its contacts to the right, breaking the contacts 10 and 13 and 11 and 14, and making the contacts 12 and 15. When the latter contacts close, direct current flows through the primary winding 2.

When the contacts 10 and 13 break, the energization of coil 8 is cut off and the resilience of the reed swings it back toward its unstressed position, thereby breaking the contacts 12 and 15, and cutting off the current flow through primary winding 2. The reed 6 therefore oscillates at its natural frequency intermittently energizing the winding 2 each time that the contacts 12 and 15 close. The resulting alternate increase and decrease in the current through the primary winding 2 induces an alternating potential in the secondary winding 3, which appears across the output terminals 4.

When the circuit is energized, the capacitor 23 starts to charge through resistor 22, but a portion of the charge is leaked off through resistor 25 each time contact 11 closes against contact 14. Consequently, as long as the reed continues to vibrate, the potential of capacitor 23 is prevented from rising high enough to trip the double-base diode 26 and the device 31. If the reed 6 sticks in the position where the contacts 12 and 15 are closed, so that a current is continuously flowing through the winding 2, then the charge on capacitor 23 stops leaking off and the potential of junction 24 increases, approaching that of the positive supply line 18. At some predetermined potential value, established by the selection of resistors 28 and 30, the double-base diode 26 sends a signal through the wire 32 to control electrode 31c of the device 31, whereupon that device breaks down and imposes a low impedance load on the battery 16, thereby sending a high current through the fuse 17 and disrupting it. The winding 2 is thereby protected by the fuse 17, even though the fuse 17 may have a current rating substantially greater than the continuous current rating of the winding 2.

While the circuit breaking device 17 has been illustrated and described as a fuse, it will readily be recognized that, within the broader aspects of my invention, it may be replaced by other current responsive circuit-interrupting devices which would be mechanically equivalent, as far as the protective function of the circuit is concerned.

There is shown in FIG. 2 a plug-in unit including one casing 36, the vibrator 5 and the fuse 17. The coil 8 is shown as being mounted on a frame 33 which extends upwardly from the base 34 of the unit. The contacts 13, 14 and 15 are mounted on the same frame. The fuse 17 is also mounted on that frame, on the opposite side thereof from the contact 12. The contacts 13, 14 and 15 and the terminals of the fuse 17 must be suitably insulated from the frame 33, which is typically at ground potential.

Where the fuse 17 blows out, it is usually because the reed 6 has failed by sticking. The vibrator is therefore defective and should be replaced along with the fuse. The placing of both the fuse and the vibrator reed in the same unit makes it certain that the correction of one of the two defects (failure of the vibrator and failure of the fuse) will also correct at the same time the other defect.

While I have shown and described a preferred embodiment of my invention, other modifications thereof will readily occur to those skilled in the art, and I therefore intend my invention to be limited only by the appended claim.

I claim:

Protective apparatus for a direct-to-alternating current converter, comprising:
 (a) a source of direct current;
 (b) a transformer having a primary winding;
 (c) a vibrator including:
  (1) a reed carrying two movable contacts on opposite sides thereof;
  (2) two stationary contacts cooperating respectively with the movable contacts; and
  (3) motor means for vibrating the reed;
 (d) a primary winding energizing circuit including one of the stationary contacts and the cooperating movable contact;
 (e) a capacitor;
 (f) a circuit for charging the capacitor from the source, including a resistor;
 (g) a circuit for discharging the capacitor periodically including the other stationary contact and its cooperating movable contact;
 (h) a fuse connected between the source and the primary winding and having a current carrying capacity greater than that of the winding, said fuse and said vibrator being mounted together in a pluggable unit; and
 (i) means operatively connected to the capacitor and the fuse and responsive to the potential across the capacitor and effective when that potential exceeds a predetermined value to overload the fuse and thereby open the circuit through the primary winding, said potential responsive means including:
  (1) a controlled semiconductor device having an anode, a cathode, and a control electrode;
  (2) means connecting the anode and cathode in a circuit branch electrically parallel to the primary winding energizing circuit;
  (3) a double-base diode having two bases and an emitter;
  (4) means connecting the two bases in a circuit branch electrically parallel to the primary winding energizing circuit;
  (5) means connecting the emitter to the capacitor terminal farthest from the source; and
  (6) means connecting one of the bases to the control electrode of the semiconductor device.

References Cited

UNITED STATES PATENTS

| | | | |
|---|---|---|---|
| 2,925,548 | 2/1960 | Scherer | 317—33 |
| 2,986,675 | 5/1961 | Burson et al. | 339—17 X |
| 3,037,158 | 5/1962 | Schmidt | 321—14 |
| 3,213,321 | 10/1965 | Dalziel | 317—33 X |

FOREIGN PATENTS 1,300,021   6/1962   France.

JOHN F. COUCH, *Primary Examiner.*

G. GOLDBERG, *Assistant Examiner.*